US 7,105,237 B2

(12) United States Patent
Sotzing

(10) Patent No.: US 7,105,237 B2
(45) Date of Patent: *Sep. 12, 2006

(54) SUBSTITUTED THIENO[3,4-B]THIOPHENE POLYMERS, METHOD OF MAKING, AND USE THEREOF

(75) Inventor: Gregory Allen Sotzing, Storrs, CT (US)

(73) Assignee: The University of Connecticut, Storrs, CT (US)

(*) Notice: Subject to any disclaimer, the term of this patent is extended or adjusted under 35 U.S.C. 154(b) by 155 days.

This patent is subject to a terminal disclaimer.

(21) Appl. No.: 10/955,565

(22) Filed: Sep. 30, 2004

(65) Prior Publication Data

US 2005/0124784 A1 Jun. 9, 2005

Related U.S. Application Data

(60) Provisional application No. 60/508,037, filed on Oct. 1, 2003.

(51) Int. Cl.
*B32B 9/04* (2006.01)

(52) U.S. Cl. ............... 428/704; 528/373; 528/377; 528/380; 429/310; 257/E51.029

(58) Field of Classification Search ............... None
See application file for complete search history.

(56) References Cited

U.S. PATENT DOCUMENTS

| | | | | |
|---|---|---|---|---|
| 4,663,001 A * | 5/1987 | Lazzaroni et al. | ......... | 205/419 |
| 4,910,645 A | 3/1990 | Jonas et al. | ......... | 361/525 |
| 4,959,430 A | 9/1990 | Jonas et al. | ......... | 526/257 |
| 5,109,070 A | 4/1992 | Epstein et al. | ......... | 525/189 |
| 5,300,575 A | 4/1994 | Jonas et al. | ......... | 525/186 |
| 5,691,062 A | 11/1997 | Shalaby et al. | ......... | 428/411.1 |
| 6,194,540 B1 | 2/2001 | Ito et al. | ......... | 528/373 |
| 6,242,561 B1 | 6/2001 | Mohwald et al. | ......... | 528/377 |
| 6,294,245 B1 | 9/2001 | Roitman et al. | ......... | 428/212 |
| 2002/0011420 A1 | 1/2002 | Roitman et al. | ......... | 205/419 |
| 2004/0010115 A1* | 1/2004 | Sotzing | ......... | 528/377 |
| 2004/0074779 A1* | 4/2004 | Sotzing | ......... | 205/414 |

FOREIGN PATENT DOCUMENTS

| | | | |
|---|---|---|---|
| CA | 2343444 | * | 3/2000 |
| EP | 0 999 242 A1 | | 5/2000 |
| WO | WO 91/06887 | | 5/1991 |

OTHER PUBLICATIONS

"Synthesis and Characterization of a Soluble and Transparent Conducting Polymer, Poly(3,4-ethylenedioxythiophene)" Mol. Cryst. 1000, 327, 237-240.*
Abstract of "Electrophilic Substitution of Thieno[2,3-b]thiophene and Thieno[3,2-b]thiophene. Quantitative Study." Chemica Scripta 1972, 2(2), p. 137-142.*
A. Bongini, et al., "New n-Dopable Thiophene Based Polymers", Synthetic Metals 101 (1999) pp. 13-14.

J. Eldo, et al., "New Low Band Gap Polymers: Control of Optical and Electronic Properties in near Infrared Absorbing PI-Conjugated Polysquaraines", Chemistry Materials, 2002, 14, pp. 410-418.
Xiaomin Gu, "Part I: Syntheses and Characterization of Poly (2-Decylthieno[3,4-b]Thiophene), A Low Bandgap Conducting Polymer Part II: Formation and Trapping of Methoxy (Methoxy-Carbonyl) Ketene" Dissertation, Dec. 1995, 182 pages, The University of Texas at Arlington.
B. Lee, et al., "Agueous Phase Polymerization of Thieno[3,4-b] Thiophene", Polymer Preprints 2002, 43(2) pp. 568-569.
K. Lee, et al., "Poly(thieno[3,4-b]thlophene). A New Stable Low Band Gap Conducting Polymer", Macromolecules 2001, 34, pp. 5746-5747.
K. Lee, et al., "Thieno[3,4-b]thiophene as a Novel Low Oxidation Crosslinking Agent", Polymeric Materials: Science and Engineering 2002, 86, p. 195.
K. Lee, et al., "Toward the Use of Poly(Thieno[3,4-b] Thinophene) in Optoelectronic Devices", Polymer Preprints 2002, 43(2), pp. 610-611.
D. C. Loveday, et al., "Synthesis and Characterization of p- and n-Dopable Polymers. Electrochromic Properties of Poly 3-(p-trimethylammoniumphenyl)bithiophene", Synthetic Metals 84 (1997) pp. 245-246.
H. Meng, et al., "A Robust Low Band Gap Processable n-Type Conducting Polymer Based on Poly(isothianaphthene)", Macromolecules 2001, 34, pp. 1810-1816.
C.J. Neef, et al., "Synthesis and Electronic Properties of Poly(2-phenylthieno[3,4-b]thiophene): A New Low Band Gap Polymer", Chemistry Materials 1999, 11, pp. 1957-1958.
M. Pomerantz, et al., "Poly(2-decylthieno[3,4-b]thiophene-4,6-diyl). A New Low Band Gap Conducting Polymer", Macromolecules 2001, 34, pp. 1817-1822.
V. Seshadri, et al., "Ion Transport Behavior of Polymers and Copolymers Containing Thieno[3,4-b]Thiophene", Polymer Preprints 2002, 43(2), pp. 584-585.
G. A. Sotzing, et al., "Intrinsically Conducting Polymers and Green Chemistry", Polymer Preprints 2002, 43(2), pp. 904-905.
G. A. Sotzing, et al., "Poly(thieno[3,4-b]thiophene) as a Low Band Gap Conducting Polymer and Electrochromic Material", Polymeric Materials: Science & Engineering 2001, 85, pp. 604-605.
G. A. Sotzing, et al., "Preparation and Characterization of Fully Conjugated Intrinsically Conducting Polymer Networks", Polymeric Materials: Science and Engineering 2002, 86, pp. 40-41.
K. Lee, et al., "Synthesis of poly(thieno[3,4-b]thiophene) and its electrochemical characterizations", Polymer Preprints 2001, 42(2), pp. 413-414.
H. Wynberg, et al., "Thieno[3,4-b]Thiophene. The Third Thiophthene", Pergamon Press Ltd, 1967, Tetrahedron Letters No. 9, pp. 761-764.

(Continued)

*Primary Examiner*—Marc S. Zimmer
(74) *Attorney, Agent, or Firm*—Cantor Colburn LLP

(57) ABSTRACT

Substituted thieno[3,4-b] thiophene polymers and copolymers are disclosed. Adjusting the type and quantity of substitution allows for the intricate control of the resulting polymer's conductivity, optoelectronic properties, and/or solubility. A process for preparing such polymers and use thereof are also provided.

35 Claims, 1 Drawing Sheet

OTHER PUBLICATIONS

M. Pomerantz, et al., "Poly(2-decylthieno[3.4-b]thiophene). A New Soluble Low-Bandgap Conducting Polymer", Synthetic Metals 84 (1997), pp. 243-244.

C. J. Neef, et al., "Synthesis and Electronic Properties of Poly(2-Phenylthieno[3,4-b]Thiophene)", Polymer Preprints 1998, 39(1), pp. 147-148.

Wei, et al., "Synthesis and Physical Properties of Highly Sulfonated Polyanaline" J. Am. Chem. Soc., 1996, 118, pp. 2545-2555.

Wei, et al., "Synthesis of Highly Sulfonated Polyanaline", Synthetic Metals 74, (1995) pp. 123-125.

Yue et al., "Comparison of Different Synthetic Routes for Sulphonation of Polyanaline", POLYMER (1992), vol. 33, No. 20, pp. 4410-4418.

Yue, et al., "Effect of Sulfonic Acid Group on Polyanaline Backbone", J. Am. Chem. Soc. 1991, 113, pp. 2665-2671.

Yue, et al., "Synthesis of Self-Doped Conducting Polyanaline", J. Am. Chem. Soc. 1990, 112, pp. 2800-2801.

* cited by examiner

SUBSTITUTED THIENO[3,4-B]THIOPHENE POLYMERS, METHOD OF MAKING, AND USE THEREOF

CROSS-REFERENCE TO RELATED APPLICATIONS

This application claims the benefit of U.S. patent application Ser. No. 60/508,037, filed Oct. 1, 2003, which is incorporated by reference herein in its entirety.

FIELD OF THE INVENTION

This invention relates to polymeric compositions comprising units derived from thieno[3,4-b]thiophene wherein the units contain substituents, methods of producing such polymeric compositions, and applications utilizing the compositions.

BACKGROUND

Intrinsically conducting polymers are of wide utility in applications such as electronic packaging, organic light-emitting diodes (LEDs), electrochromic windows, volatile organic gas sensors, and the like. Intrinsically conducting polymers of particular interest possess a relatively low band gap (Eg), which refers to the energy difference between two electronic energy levels (the conduction band and the valence band). The band gap exhibited by a given polymer depends upon a variety of factors, including the structure of the monomer(s) used to form the polymer. For example, intrinsically conductive polymers formed from thiophene and substituted thiophene monomers are known. Poly(thiophene) has a band gap of 2.1 electron volts (eV), poly(2-decylthieno[3,4-b]thiophene) has a band gap of 0.92 eV, and poly(2-phenylthieno[3,4-b]thiophene) has a band gap of 0.85 eV. Intrinsically conductive polymers comprising polymerized units of thieno[2,3-b]thiophene and thieno[3,2-b]thiophene are also known.

Unfortunately, there are a number of drawbacks associated with many of the intrinsically conducting polymers currently available. The Eg of many polymers is undesirably high, and/or the polymers are not stable. Transparency is difficult to achieve, limiting their use in optical devices. Those consisting solely of aromatic repeat units in the backbone are typically not soluble in water, requiring manufacture and processing in organic solvents.

Of course, replacement of organic solvents with aqueous solvents in the synthesis, use, and processing of intrinsically conductive polymers would be highly desirable from an environmental and cost standpoint. U.S. Pat. No. 5,300,575 discloses dispersions of poly(thiophenes) that are suitable for use as antistatic coatings for plastic moldings. The poly(thiophenes) are prepared by polymerizing a di-substituted thiophene (e.g., 3,4-ethylenedioxythiophene) in the presence of a polyanion and oxidizing agents, oxygen and/or air. The resulting linear polymer is purified using both anion and cation exchange resins wherein poly(styrene sulfonate) serves as a charge compensating dopant. The resulting polymer forms a colloidal dispersion in water, presumably because poly(styrene sulfonate) is soluble in water and demonstrates a strong ionic interaction with the cationic poly(3,4-ethylenedioxy)thiophene backbone. The resulting polythiophenes have an Eg of 1.7 eV.

There remains a continuing need in the art, however, for intrinsically conducting polymers that exhibit useful band gaps for industrial applications, that can be readily dispersed or dissolved in water, and for the convenient adjustment of the conductivity and/or optoelectronic properties such as the band gap and energy levels of the valence band and the conduction band of such polymers to meet the needs of a particular application.

BRIEF SUMMARY OF THE INVENTION

A composition comprises a substituted polymer comprising units of substituted thieno[3,4-b]thiophene prepared by electrophilic substitution of a first polymer comprising thieno[3,4-b]thiophene units, wherein the electrophilic substitution reaction is sulfonation, nitration, halogenation, or a combination comprising at least one of the foregoing reactions.

In another embodiment, a composition comprises a substituted polymer comprising units of substituted thieno[3,4-b]thiophene prepared by electrophilic substitution of a first polymer comprising thieno[3,4-b]thiophene units, wherein the electrophilic substitution reaction is sulfonation, nitration, alkylation, acylation, halogenation, or a combination comprising at least one of the foregoing reactions; and wherein about 10 to about 80 mole percent of the thieno[3,4-b] thiophene units are substituted.

A method of preparing a polymer comprises performing an electrophilic substitution reaction on a first polymer comprising thieno[3,4-b]thiophene units to form a substituted polymer comprising substituted thieno[3,4-b]thiophene units.

Also disclosed herein are films and articles of manufacture prepared by polymers comprising units of substituted thieno[3,4-b]thiophene in which the substituted thienothiophene is brought about by post-modification of polythienothiophene.

DETAILED DESCRIPTION OF THE INVENTION

Figure 1:
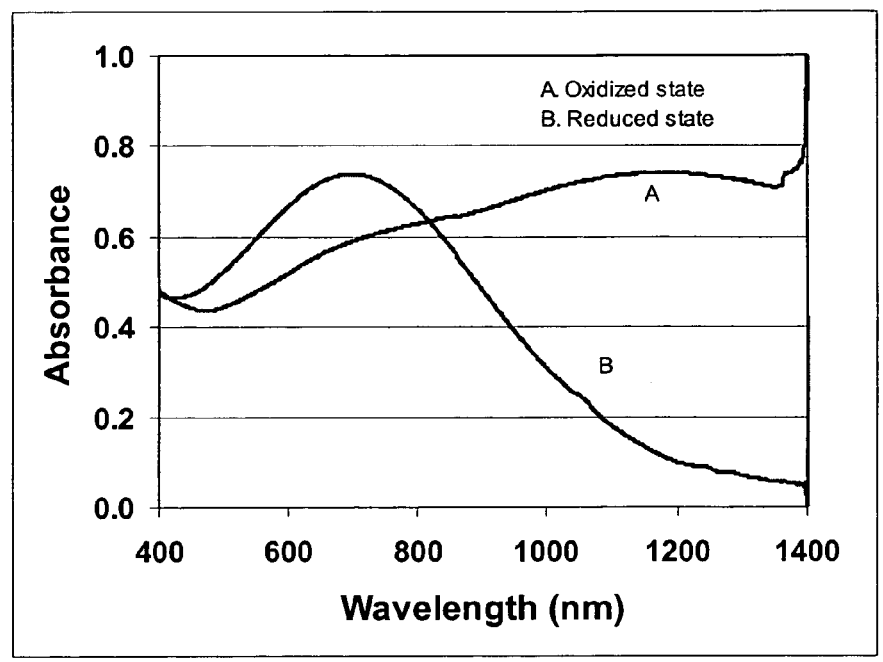
FIG. 1 displays UV-Vis spectra of both the doped form and the reduced form of sulfonated polythienothiophene.

This invention presents polymeric compositions comprising units derived from thieno[3,4-b]thiophene wherein these repeat units of the polythienothiopene have been synthetically modified to comprise substitution by a post-polymerization modification. Adjusting the types and amounts of substituents present in the polymer allows for the tailoring of the polymer's properties, such as water solubility, conductivity, and/or optoelectronic properties. In particular, substitution, especially sulfonation, advantageously converts a water insoluble polymer into a water soluble polymer allowing for water solubility (water solubility in this instance is defined as the ability of the polymer solution to be able to pass through a 0.2 micron filter) and thereby convenient processing of aqueous solutions of such material.

The substituted polymeric compositions prepared by a post-polymerization modification include homopolymers, copolymers, and oligomers formed from thieno[3,4-b]thiophene wherein the repeat units derived from thieno[3,4-b]thiophene are modified via electrophilic substitution chemistries. As used herein, the term "polymeric composition" means a composition having at least three polymerized units derived from thieno[3,4-b]thiophene. Thus, the term polymeric composition or polythienothiophene is inclusive of homopolymers, polymers, copolymers, and oligomers having at least three polymerized units of thieno[3,4-b] thiophene.

Such polymeric compositions have a very low band gap, on the order of about 0.85 to about 1.09 eV, depending on the method of manufacture. As polymerized thieno[3,4-b] thiophene exhibit such low band gaps, copolymerization with other monomeric species can provide copolymers containing thienothiophene units to obtain higher band gaps that could extend through the visible region. Therefore a broad range of band gaps may be obtained by copolymerization.

An advantageous feature of such polymeric compositions is that the thieno[3,4-b]thiophene units can be synthetically modified with various substitutions via an electrophilic substitution reaction to provide a variety of properties desired for numerous end-use applications. Such post-polymerization modification can provide further optimization of optoelectronic properties, conductivity, and/or water solubility unavailable from a polymer obtained directly from a polymerization process. In particular, the polymer can be synthetically modified to contain substitution on the thienothiophene units that aids in the solubility of the polymer depending upon the solvent of choice, organic or aqueous. In one embodiment, the polymer is modified to result in a polymer that is soluble or dispersible in water. Other substitution may provide for interaction with other compounds to form complexes to further adjust the optoelectronic properties; details of such complexes are described herein. Post-polymerization modification can therefore provide differently colored water- or organic solvent-soluble conjugated polymers having a broad range of band gaps regardless of the polymerization process used to prepare the starting polythienothiophene.

The substituted polymers can be processed by conventional methods to provide uniform, thin films that possess utility in numerous applications, including electrochromic displays, optically transparent electrodes, hole transport layers for light emitting diodes, and antistatic coatings. In the reduced conjugated form, these polymers could be utilized as light and NIR absorbing dyes to be used in the construction of photovoltaic devices.

Post-polymerization modification of polymers comprising units derived from thieno[3,4-b]thiophene is preferably achieved via an electrophilic substitution reaction at the thienothiophene units. As the polythienothiophene is electron rich and contains positions alpha to the sulfur atoms that are spatially distant from one another, electrophilic substitution may easily be acheived. Methods of electrophilic substitution known in the art may be used to prepare the substituted polymer. Suitable electrophilic substitution reactions include, for example, sulfonation, nitration, alkylation, acylation, halogenation, and the like. An exemplary method of nitration includes the use of nitric acid and acetic acid or fuming sulfuric acid. Sulfonation may be effected, for example, by addition of fuming sulfuric acid to the polymer at about 0° C. followed by heating. The polymer is not dissolved in the water when the reaction occurs and as such this sulfonation is a heterogenous reaction. Friedel-Crafts acylation conditions are known in the art and may be used to acylate the thieno[3,4-b]thiophene units.

When undergoing the substitution reaction, such as sulfonation, the starting polythienothiophene may be in its fully reduced form. Optionally, the polythienothiophene may be in its oxidized form (e.g. when prepared by oxidative polymerization) or partially reduced form. Preferably, the fully reduced form is used as the starting material in the substitution reaction since this form is the most electron rich. The reduced form may be obtained by using chemical reducing agents, or if the polymer was prepared electrochemically, by the use of electrochemical reduction. Conjugated polymers prepared by metal catalyzed cross-coupling reactions are isolated in their reduced form and thereby do not require the use of either chemical or electrochemical reduction. Any known method of preparing polymers or copolymers comprising repeat units derived from thieno[3, 4-b]thiophene may be used as the to prepare the starting polymer which will be modified with substituents.

Adjusting the reaction conditions, such as ratio of reagents, reaction time, temperature, etc., allows for the control of the level of substitution of the polythienothiophene. As the amount of substitution may affect more than one property of the resulting polymer, the amount of substitution desired is application dependent. Generally, the amount of substitution of the substituted polymer may be about 1 to about 100 mole percent to mole of thienothiophene repeat unit of the polymer. Within this range the amount of substitution may have lower limits of about 5, about 10, about 15, about 20, about 25, about 30, about 35, about 40, about 45, and about 50; upper limits may be about 95, about 90, about 85, about 80, about 75, about 70, about 65, about 60, and about 55 wherein all of the upper and lower limits are interchangeable.

Depending upon the chemical modification chosen, the resulting substituted polythienothiophene can be tailored to have an increase in solubility, depending upon the solvent of choice. For example alkylation or acylation results in organic solvent-soluble or dispersible polymers. Nitration followed by reduction of the nitro groups to amine groups results in a polymer that is water soluble or dispersible at acidic pH. Sulfonation also results in water soluble or water dispersible polymers.

In one embodiment, the substituted polymer comprising units of thieno[3,4-b]thiophene having sulfonic acid groups or sulfonate groups, has a solubility in water of greater than or equal to about 5 mg/ml, preferably greater than or equal to about 10 mg/ml, and more preferably greater than or equal to about 25 mg/ml. In another embodiment, the substituted polymer has a particle size of less than or equal to about 300 nanometers (nm), preferably less than or equal to about 250 nm, and more preferably less than or equal to about 200 nm.

The chemical modification has also been determined to have a significant effect on the optoelectronic spectrum of the resulting substituted polymer. For example, nitro-substituted polythienothiophene, as compared to unsubstituted polythienothiophene, provides a shift in the absorption maximum to a higher energy as the nitro groups are electron withdrawing. Conversely, alkylated polythienothiophene would exhibit a shift in the absorption maximum to a lower energy as the alkyl groups are electron releasing. By adjusting the reaction conditions such as stoichiometry of reagents, reaction time, and reaction temperature, the degree of substitution on the polythienothiophene can be adjusted and, therefore, the polymer's solubility and optoelectronic properties as well.

In one embodiment, the polymer comprising units of thieno[3,4-b]thiophene is sulfonated via an electrophilic substitution reaction. The sulfonic acid groups of the substituted polymer may be converted to the sulfonate form using an appropriate base. For example, the sulfonate may be formed by the addition of a metal hydroxide such as an alkali metal hydroxide or an alkaline earth metal hydroxide. Alternatively, the sulfonate may be formed by the addition of an organic base, including monoamines including $C_1$–$C_{24}$ primary amine, $C_1$–$C_{24}$ secondary amine, $C_1$–$C_{24}$ tertiary amine, and the like; or a polyamine including diamines, triamines, tetraamines and the like such as, for example, histamine, spermine, spermidine, cadaverine, putrescine, jeffamine, polyethyleneimine, polydiallylamine, polyaniline, and the like.

Figure 2:
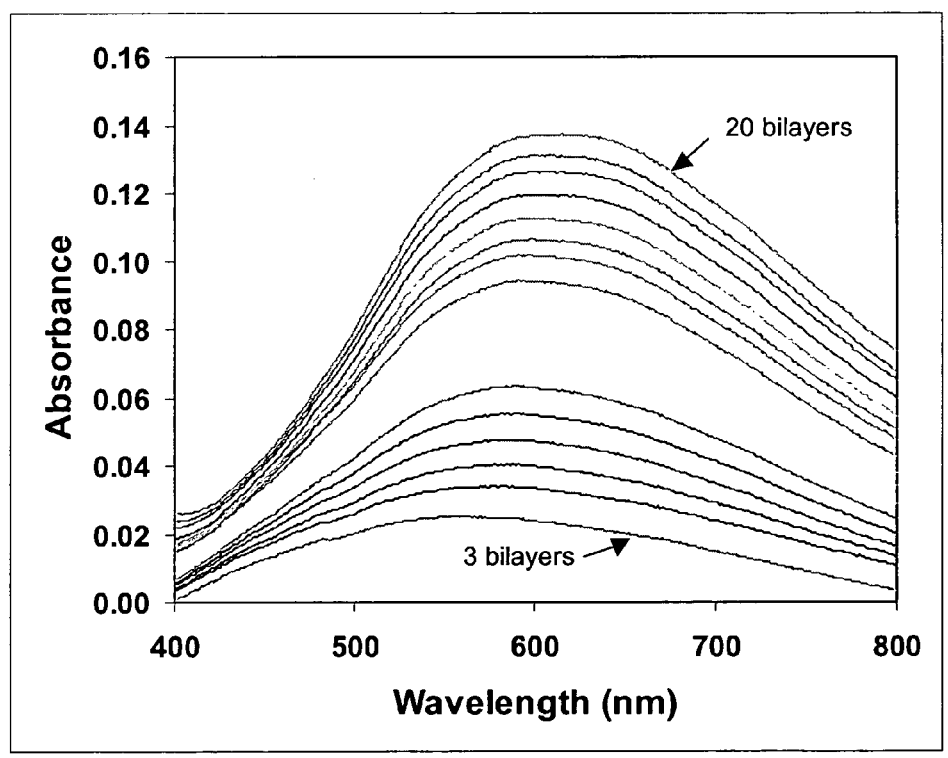
FIG. 2 displays spectra of the absorbance of layer-by-layer films of sulfonated polythienothiophene/polyethyleneimine bilayers.

In one embodiment, the composition comprises a complex comprising polythienothiophene substituted with sulfonic acid groups, and a base. The strong ionic interaction between the base and the sulfonic acid groups provide a shift in the band gap as compared to the polymer absent a base. By virtue of the sulfonic acid groups that are in conjugation with the conjugated polythiophene backbone, significant changes in the band gap can be obtained by varying the type of base or polybase and, therefore, the corresponding strength of the sulfonate/cation interactions. For example, FIG. 1 is UV-Vis spectra of polythienothiophene (A, doped) and a sulfonated polythienothiophene (B, reduced state) wherein about 60 percent of the thieno[3,4-b]thiophene units have been sulfonated. The sulfonated polythienothiophene provides an lmax of approximately 750 nanometers. FIG. 2 provides UV-Vis spectra of layer-by-layer films comprising alternating layers of polyethyleneimine and sulfonated polythienothiophene. The lmax of the acid/base complex is approximately 600 nm, the result of the ionic interactions between polyacid and polybase. By virtue of the substitution on the thieno[3,4-b]thiophene units of the polymer, changing the acid/base chemistry allows for different ionic interactions that can shift the band gap and respective energies of the valence and conduction bands. Such versatility is not observed with other intrinsically conducting polymers in the art that may comprise sulfonic acid groups such as sulfonated polyaniline as the benzene units of polyaniline are not in full conjugation with each other.

Optionally, the substituted polymer may be blended with other conjugated polymers or conventional insulating polymers to further control the resulting conductivity and/or optoelectronic properties of the resulting blend. Suitable conjugated polymers or insulating polymers include, for example, polyethylene oxide, polyethyleneglycol, polyacrylic acid, cellulose, cellulose acetate, polycaprolactone, polytetrahydrofuran, polyvinylbutyral, polyvinyl acetate, polyvinylalcohol and the like. When blended, the amount of substituted polymer may be in any amount based upon the application of the resulting blend, from about 1 to about 99 weight percent based on the total weight of the blend.

The starting polythienothiophene homopolymers, polymers, copolymers, and oligomers that are modified by the post-polymerization electrophilic substitution process may be prepared by several different techniques to result in a variety of polymers. Such techniques include oxidative chemical polymerization using a chemical oxidant such as, for example, ferric species including ferric chloride, ferric sulfate, and the like; ammonium persulfate; hydrogen peroxide; and the like. Another technique includes oxidative electrochemical reaction by which a potential is applied to a solution of thieno[3,4-b]thiophene and optional other monomers in the presence of salts. Suitable cations include, for example, tetraalkylammonium, lithium, sodium, and the like; and suitable anions include, for example, perchlorate, hexafluorophosphate, tetrafluoroborate, tosylate, dodecyltosylate, camphor sulfonate, methane sulfonate, ethane sulfonate, trifluoromethansulfonate, trifluoromethanesulfonamide, chloride, bromide, iodide, and the like. Other techniques to produce the polythienothiophene include metal mediated cross-coupling polymerization, including Grignard coupling, Yamamoto coupling, Ullmann coupling, Stille coupling, and the like. Several techniques of preparation of polymers comprising units of thieno[3,4-b]thiophene are described in pending U.S. patent application Ser. No. 10/618,262, which is incorporated by reference herein in its entirety.

The polythienothiophene includes homopolymers of thieno[3,4-b]thiophene and copolymers comprising units of thieno[3,4-b]thiophene and units of from one or more additional monomers. The additional monomers include electroactive monomers and/or non-electroactive monomers. "Electroactive monomer" as used herein means a monomer or oligomer that is capable of copolymerization with thieno[3,4-b]thiophene, and that imparts or enhances the electrical/electronic properties of the resulting copolymer, including such properties as electrical conductivity, semiconductivity, electroluminescence, electrochromicity, photovoltaic properties, and/or the like. "Non-electroactive monomer" means a monomer that is capable of copolymerization and that either decreases or does not adversely affect the electrical/electronic properties of the resulting copolymer. Preferably, the non-electroactive monomer does not adversely affect the electrical/electronic properties of the resulting copolymer.

Examples of suitable electroactive monomers include those known in the art to exhibit electroactivity, including but not limited to thiophene, substituted thiophenes, substituted thieno[3,4-b]thiophenes, dithieno[3,4-b:3',4'-d]thiophene, bithiophene, pyrrole, substituted pyrroles, phenylene, substituted phenylenes, naphthalene, substituted naphthalenes, biphenyl and terphenyl and their substituted versions, phenylene vinylene, substituted phenylene vinylene, and the like. As used herein "substituted" means replacement of one or more hydrogens with one or more substituents that do not significantly adversely affect polymerization and/or use of the polymer. Suitable substituents include, for example, —H, hydroxyl, $C_6$–$C_{36}$ aryl, $C_3$–$C_6$ cycloalkyl, $C_1$–$C_{12}$ alkyl, halogen (i.e., F, Cl, Br, I), $C_1$–$C_{12}$ alkoxy, $C_1$–$C_{12}$ alkylthio, $C_1$–$C_{12}$ perfluoroalkyl, $C_6$–$C_{36}$ perfluoroaryl, pyridyl, cyano, thiocyanato, nitro, amino, $C_1$–$C_{12}$ alkylamino, $C_1$–$C_{12}$ aminoalkyl, acyl, sulfoxyl, sulfonyl, amido, and/or carbamoyl.

Suitable substituted thieno[3,4-b]thiophenes are represented by the formula:

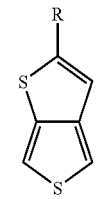

wherein R is $C_1$–$C_{12}$ primary, secondary, or tertiary alkyl, cylcoalkyl, $C_6$–$C_{36}$ aryl, or a functional group such as hydroxyl (—OH), $C_1$–$C_{12}$ alkyl ether, carboxylic acid, $C_1$–$C_{12}$ alkyl carboxylic acid ester, or sulfonic acid (—$SO_3H$). "Aryl" as used in this application means a compound having the ring structure characteristic of benzene, naphthalene, phenanthrene, anthracene, and the like, for example phenyl ($C_6H_5$) or naphthyl ($C_{10}H_7$). The alkyl or aryl group may be unsubstituted or substituted as described above.

Suitable substituted thiophenes include those described in U.S. Pat. No. 4,959,430, for example, and having the formula:

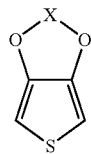

wherein X is $C_1$–$C_4$ alkylene or substituted $C_1$–$C_4$ alkylene. In a preferred embodiment, X is $C_1$–$C_{12}$ alkyl- or $C_6$–$C_{12}$ phenyl-substituted ethylene, or a 1,2-cyclohexylene. Optionally, the alkyl or phenyl groups can be further substituted as described above. A preferred substituted thiophene includes 3,4-ethylenedioxythiophene.

Additional suitable substituted thiophenes include those described in U.S. Pat. No. 4,910,645, for example, and having the structure:

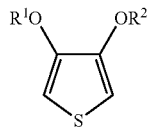

wherein $R^1$ and $R^2$ are each independently —H, $C_1$–$C_4$ alkyl, phenyl, and substituted phenyl.

Still other suitable substituted thiophenes include those having the structure:

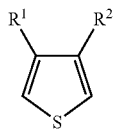

wherein wherein $R^1$ and $R^2$ are each independently —H, $C_1$–$C_4$ alkyl, phenyl, and substituted phenyl.

Other monomers include, for example, isathianaphthene, pyridothiophene, pyrizinothiophene, and derivatives according to the structure:

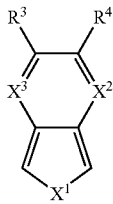

wherein $X^1$ is S, O, N—H, N—R, wherein R is —H or $C_1$–$C_{12}$ alkyl; $X^2$ and $X^3$ are the same or different and are C or N; $R^3$ and $R^4$ are the same or different and are —H, hydroxyl, $C_6$–$C_{36}$ aryl, $C_3$–$C_6$ cycloalkyl, $C_1$–$C_{12}$ alkyl, halogen, $C_1$–$C_{12}$ alkoxy, $C_1$–$C_{12}$ alkylthio, $C_1$–$C_{12}$ perfluoroalkyl, or $C_6$–$C_{36}$ perfluoroaryl.

Suitable pyrrole and its derivatives are those, for example according to the structure:

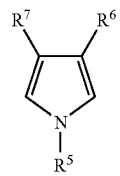

wherein $R^5$ is —H or $C_1$–$C_{12}$ alkyl, and $R^6$ and $R^7$ are the same of different and are —H, hydroxyl, $C_6$–$C_{36}$ aryl, $C_3$–$C_6$ cycloalkyl, $C_1$–$C_{12}$ alkyl, halogen, $C_1$–$C_{12}$ alkoxy, $C_1$–$C_{12}$ alkylthio, $C_1$–$C_{12}$ perfluoroalkyl, or $C_6$–$C_{36}$ perfluoroaryl.

Suitable monomers of 3,4-ethylenedioxypyrrole and derivatives include those of the structure:

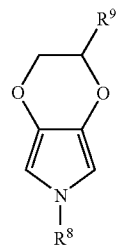

wherein $R^8$ is —H or $C_1$–$C_{12}$ alkyl, and $R^9$ is —H, hydroxyl, $C_6$–$C_{36}$ aryl, $C_3$–$C_6$ cycloalkyl, $C_1$–$C_{12}$ alkyl, halogen, $C_1$–$C_{12}$ alkoxy, $C_1$–$C_{12}$ alkylthio, $C_1$–$C_{12}$ perfluoroalkyl, or $C_6$–$C_{36}$ perfluoroaryl.

Yet additional monomers include thionapthene, benzofuran, indole and their derivatives as shown in the structure:

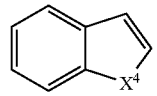

wherein $X^4$ is S, O, N—H, N—$R^{10}$, wherein $R^{10}$ is —H or $C_1$–$C_{12}$ alkyl.

Further examples of suitable monomers include thienofuran, thienopyrrole, furanylpyrrole, furanylfuran, pyrolylpyrrole, and derivatives as shown in the structure:

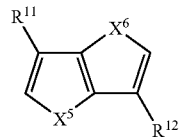

wherein $X^5$ and $X^6$ may be the same or different and are S, O, N—H, N—$R^{13}$; $R^{11}$ and $R^{12}$, are the same or different and are H, hydroxyl, $C_6$–$C_{36}$ aryl, $C_3$–$C_6$ cycloalkyl, $C_1$–$C_{12}$ alkyl, halogen, $C_1$–$C_{12}$ alkoxy, $C_1$–$C_{12}$ alkylthio, $C_1$–$C_{12}$ perfluoroalkyl, or $C_6$–$C_{36}$ perfluoroaryl; $R^{13}$ is —H or $C_1$–$C_{12}$ alkyl.

Still other monomers include dithienothiophene, difuranylthiophene, dipyrrolylthiophene, dithienofuran, dipyrrolylfuran, dipyrrolylpyrrole, and derivatives as shown in structure:

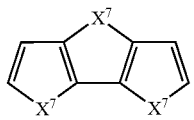

wherein each $X^7$ is independently S, O, N—H, N—$R^{14}$; $R^{14}$ is —H or $C_1$–$C_{12}$ alkyl.

A preferred type of polymeric composition comprises thieno[3,4-b]thiophene units and/or substituted thieno[3,4-b]thiophene units wherein the end units are substituted with reactive functional groups. Such polymers, preferably oligomers, may be incorporated into block copolymers directly by reaction between the functional groups or with other monomers or oligomers to form copolymeric compositions. Alternatively, the endgroups may be further derivatized with difunctional reactants known in the art (for example, hydroxyl endgroups could be coupled with diisocyanates or molecules containing at least two acid chlorides). The oligomers thus derivatized may then be coupled with each other, or other co-reactive monomers or polymers. Use of such derivatized oligomers in the formation of polymers provides a convenient method for controlling the conjugation length of the polymeric compositions of this invention. The conjugation length in the oligomeric structure can be varied to achieve desired properties for a variety of applications.

In one embodiment, the copolymer comprises 1 to about 99 percent thieno[3,4-b]thiophene units, preferably about 20 to about 90 percent, more preferably about 30 to about 80 percent, and yet more preferably about 40 to about 70 percent thieno[3,4-b]thiophene units present in the copolylmer.

The substituted polythienothiophene may be used in the form of dispersions comprising the polymer and an organic or aqueous liquid. It is to be understood that the term "dispersion" as used herein is inclusive of compositions wherein none or a portion of the polymeric composition is fully dissolved in the liquid. Preferably, the polymeric compositions are in the form of small particles that are storage stable, i.e., remain in substantially the same particulate form for at least about 24 hours, more preferably at least about 48 hours, even more preferably at least about one week, and most preferably at least about one month. In an especially preferred embodiment, the liquid carrier is the same as the solvent in which the polymeric compositions are manufactured, preferably water and/or one or more water-miscible organic solvents. Of course, additional solvent may be used to dilute the dispersion if desired. The amount of the polymeric composition in the dispersion may vary depending upon a variety of factors, for example the nature of the solvent, the nature of the polymer, the molecular weight of the polymer, the end-use application, and the like, and is readily determined by one of ordinary skill in the art without undue experimentation, and can vary from 1 to 99 percent by weight.

Furthermore, the substituted polythienothiophenes may be utilized in the form of a solution of substituted polythienothiophene wherein solubility is defined as a polymer able to pass through a 0.2 micrometer filter. In a preferred embodiment, the substituted polythienothiophene is water soluble. By adjusting the amount and type of substitution, the substitution may provide better dispersibility in addition to solubility.

Dispersions or solutions containing the polymeric compositions can be formed into films by applying the dispersions or solutions to a substrate via conventional processes including ink jet printing, screen printing, roll to roll printing processes, reel to reel processing, spin coating, meniscus and dip coating, spray coating, brush coating, doctor blade application, curtain casting, drop casting, and the like, to form a layer. Suitable substrates are solid materials (flexible or rigid) suitable for deposition of the polymeric compositions, and may be, for example, glass, an organic polymer such as a plastic, silicon, a mineral, a semiconducting material, a ceramic, a metal, and the like, as well as a combination comprising at least one of the foregoing materials. The substrate may be inherently conductive.

The liquid may be removed from the layer of the dispersion or solution by conventional techniques, to form a film. Removal of the liquid may be effected at room temperature or other temperature that does not adversely affect the properties of the resulting film. However, to obtain higher processing speeds, the film is preferably dried at elevated temperatures.

In one embodiment, films of the polymer may be prepared by a layer-by-layer technique using aqueous solutions of the substituted polymers to form ultra thin films. In an exemplary process of this type a substrate is coated with a layer of the sulfonated polymer followed by a coating of a base, such as a polymeric base, to result in a bilayer. Repeating the process results in a multilayered substrate having increased optoelectronic properties relative to the unsulfonated materials. Not wishing to be bound by theory, it is believed that the deprotonation of the sulfonic acid groups and the interaction of the sulfonate-cation significantly affects the optoelectronic properties as the sulfonic acid groups are in direct conjugation with the polythienothiophene. Therefore, adjusting the type of base material used allows for the ability to control the resulting optoelectronic properties of the resulting films.

The electrical conductivity of the films can be readily modified, if necessary, to meet the requirements of a desired application by doping with conventional acidic dopants (p-dopants) or basic dopants (n-dopants) known in the art. p-Dopants are preferred. Suitable p-dopants include mineral acids such as HCl, $HNO_3$, $H_2SO_4$, $H_3PO_4$, HBr, and HI; organic sulfonic acids such as dodecyl benzene sulfonic acid, lauryl sulfonic acid, camphor sulfonic acid, organic acid dyes, methane sulfonic acid, and toluene sulfonic acid; polymeric sulfonic acids such as poly(styrene sulfonic acid) and copolymers of styrene sulfonic acids; carboxylic acids such as adipic acid, azelaic acid, and oxalic acid; and polycarboxylic acids such as poly(acrylic acid) poly(maleic acid), poly(methacrylic acid) and copolymers formed from acrylic acid, maleic acid, and/or methacrylic acid. Conventional mixed dopants comprising one or more of the foregoing, such as a mixture of a mineral acid and an organic acid, can also be used to impart the desired electroactive character to the films. Suitable basic dopants include, but are not limited to Na, K, Li and Ca. Other suitable dopants include $I_2$, $PF_6$, $SbF_6$, and $FeCl_3$. In some instances the oxidant and the dopant may be the same.

Admixtures of the polymeric compositions with other electroactive materials such as laser dyes, other electroactive polymers, hole transport or electron transport materials, including electroactive organometallic compounds, are also within the scope of this invention. Such materials are preferably added to the polymeric composition before or after formation of a solution. Additives such as ethylene glycol, diethylene glycol, mannitol, propylene 1,3-glycol, butane 1,4-glycol, N-methyl pyrrolidone, sorbitol, glycerol, propylene carbonate and other appropriate high boiling organics may be added to dispersions of the polymeric compositions to improve conductivity.

Additional additives may also be used, and include conductive fillers such as particulate copper, silver, nickel, aluminum, carbon black (carbon nanotubes, buckminister fullerene) and the like; non-conductive fillers such as talc, mica, wollastonite, silica, clay, $TiC_2$, dyes, pigments (zeolites) and the like, to promote specific properties such as increased modulus, surface hardness, surface color and the like; antioxidants; UV stabilizers; viscosity modifiers; and surfactants such as acetylenic diols, surfactants typically being added to control stability, surface tension, and surface wettability.

Films comprising the above-described polymeric compositions can be utilized in a variety of applications, including antistatic coatings, electrically conductive coatings, electrochromic devices, photovoltaic devices, light emitting diodes for display applications, near infrared light emitting diodes, flat panel displays, photoimageable circuits, printable circuits, thin film transistor devices, batteries, electrical switches, capacitor coatings, corrosion resistant coatings, electromagnetic shielding, sensors, biosensors, dimmable mirrors, type III supercapacitors, and the like.

The above-described polymeric compositions are particularly well suited for use in fabricating certain components of light emitting diodes (LEDs). LEDs typically comprise a substrate, and indium tin oxide (ITO) anode, a hole injection layer, a hole transport layer, a light emitting layer, an electron transport layer, an electron injection layer, and a cathode. The p-doped polymeric compositions are particularly suited for replacing the indium tin oxide anode of the LED, and/or as the hole injection layer of the LED. Undoped polymeric compositions of this invention can be utilized in the hole transport layer, the light emitting layer and/or the electron transport layer of the LED.

The above-described polymeric compositions are also particularly well suited for use in fabricating certain components of photovoltaic devices, which are constructed similarly to LEDs. Instead of electrical voltage placed across the device to produce light for the LED device, the input of light (e.g. sunlight) produces a voltage difference across the device to produce an electric current. The devices comprise a light harvesting organic or polymer intermediate layer, with hole transport/electron transport layers optionally placed between the anode and cathode. The polymeric compositions of this invention can be utilized as the anode and hole injection layers (doped) or in the light harvesting layers (undoped). Neutral conjugated polymers comprised of thienothiophene with low band gaps are particularly suited as the light harvesting materials for the lower energy region of solar radiation which includes wavelengths >650 nm.

The polymeric compositions can be utilized in fabricating electrochromic devices that permit or prevent the transmission of light through transparent substrates by application of a voltage across the substrate. As the substituted polythienothiophenes can produce color, it is possible to use these materials for electrochromic displays in both the infrared and the visible region.

The doped polymeric compositions can be utilized as antistatic coatings. Such coatings may be formed from dispersions in either organic or aqueous carriers. Such antistatic coatings can include admixtures with other polymers, including emulsions, to achieve a balance of conductivity and film properties such as adhesion to the appropriate substrate.

The polymeric compositions can also be used to render an article conductive. In one embodiment, the article is coated with a film of the polymeric composition. In another embodiment, the polymeric compositions may be used as an additive to a composition used to form the article. It is further contemplated that the compositions can be used in electroplating processes, particularly for the manufacture of printable circuits, photoimageable circuits, semiconductor devices, and the like.

While the preferred embodiment involves use of the polymeric compositions as transparent/conductive materials, conductive nontransparent coatings based on the compositions of matter of this invention also have utility in specific applications where transparency is not important but electrical conductivity is important. Certain applications such as antistatic coatings may require pigmentation that will result in loss of transparency as well as various conductive paint applications. Printed circuits employing these materials will also generally not require transparency.

The polymeric compositions of this invention can also be utilized to prepare optically transparent conductive coatings for use in optically transparent electrodes, transparent conductive adhesives, stealth coatings, transparent EMF shielding, touch screens, flat screen displays, flat antennas for mobile applications, transparent capacitor plates, and the like.

The following illustrative examples are provided to further describe how to make and use the polymeric compositions and are not intended to limit the scope of the claimed invention. Unless otherwise stated, parts and percentages in the examples are given by weight.

EXAMPLES

Starting Material A (A). Synthesis of Oxidized polythieno [3,4-b]thiophene

Thieno[3,4-b]thiophene, 2.01 g (14.15 mmol) was added to a 500 ml 3-neck round-bottomed flask. Anhydrous chloroform ($CHCl_3$, 100 ml) was added to the flask and the flask was then purged with nitrogen ($N_2$). Iron(III) chloride ($FeCl_3$, 5.53 g, 34.09 mmol) was dissolved in 240 ml of anhydrous $CHCl_3$ and transferred to dropping funnel. The $FeCl_3$ solution was added to the reaction flask slowly. The dropping was completed within 30 minutes. During the dropping of $FeCl_3$ solution, the color of the solution was purple and then turned to black. The solution was stirred overnight. The solution was then filtered and washed with methanol (MeOH) several times on the funnel. The polythieno[3,4-b]thiophene was obtained as a black powder.

Starting material B (B). Partial Reduction of Insoluble polythieno[3,4-b]thiophene The as-obtained black powder from (A) was transferred to soxhlet thimble and then extraction was carried out for two days using 400 ml of MeOH. After MeOH extraction, a second extraction was carried out using 400 ml of methylene chloride ($CH_2-Cl_2$) for 2.5 days. The resulting powder was dried in a vacuum oven at room temperature to obtain 2.14 g of black powder.

Starting Material C (C). Full Reduction of Insoluble polythieno[3,4-b]thiophene

Hydrazine monohydrate (8.0) of was added to a vial containing 0.40 g of polythieno[3,4-b]thiophene, which was prepared in accordance to the above listed procedure, and was stirred for six days. Then 30–40 ml of diethyl ether was added. A small amount of acetone (~5 ml) was added and then the mixture was filtered. Very fine black powder was obtained and dried in a vacuum oven.

Example 1

Polythieno[3,4-b]thiophene Sulfonation to <30% (Mole % Sulfonic Acid to Mole of thienothiophene Repeat Unit)

Insoluble polythieno[3,4-b]thiophene (0. g) prepared via partial reduction procedure, (B) was added to a 100 ml 1-neck round bottomed flask and then 48 ml of fuming sulfuric acid (Acros, 20% free $SO_3$) was added. The reaction mixture was stirred for three hours at room temperature. The solution was slowly added to 300 ml methanol and the temperature was kept between 10–20° C. Finally, 150 ml of acetone was added to the flask. The precipitated polymer was filtered and washed with methanol three times. Sulfonated polythieno[3,4-b]thiophene (0.73 g) of was obtained after drying.

Example 2

Polythieno[3,4-b]thiophene Sulfonation to 56% (Mole % Sulfonic Acid to Mole of Thienothiophene Repeat Unit)

Insoluble polythieno[3,4-b]thiophene (0.30 g) prepared via full reduction procedure (C) was added to a 100 ml round bottomed flask and then 40 ml of fuming sulfuric acid (Acros, 20% free $SO_3$) added. The oil bath temperature was increased to 65° C and maintained at this temperature for six hours. Stirring was continued at room temperature overnight. The solution was then slowly poured into 300 ml tetrahydrofuran and finally 100 ml of acetone was added. The reaction mixture was kept in refrigerator for overnight. Diethyl ether (300 ml) was then added for to precipitate the product. The precipitate was filtered and washed with cold methanol several times on a funnel. The solid was then dried in vacuum oven at 60° C. after which 0.2304 g of polythieno[3,4-b]thiophene sulfonic acid was obtained as a black powder. Conductivity of a pressed pellet of this material was 0.0056 S/cm as determined by four-probe conductivity measurement and its conductivity was further increased to 0.015 S/cm upon exposing the pellet to iodine ($I_2$) vapor. The sulfonation level of the polymer was calculated to be 56% by titration with sodium hydroxide.

Example 3

Polythieno[3,4-b]thiophene sulfonation to 65% (mole % Sulfonic Acid to Mole of Thienothiophene Repeat Unit)

Insoluble polythieno[3,4-b]thiophene was prepared by adding 2.21 g of thieno[3,4-b]thiophene to a 1000 ml 3-neck round-bottomed flask. Anhydrous $CHCl_3$ (100 ml) was added to the flask and the reaction flask was purged with $N_2$. $FeCl_3$ (5.85 g) was dissolved in 400 ml of anhydrous chloroform and transferred to dropping funnel. The $FeCl_3$ solution was then added to the reaction flask slowly. The dropping was completed within 45 minutes during which the color of the reaction mixture changed from purple to dark black. The solution was stirred overnight and then was filtered and washed with fresh $CHCl_3$ several times on the funnel. Insoluble polythieno[3,4-b]thiophene was obtained as a black powder which was transferred to a soxhlet thimble. Soxhlet extraction was carried out for three days using 600 ml of $CHCl_3$. After $CHCl_3$ extraction, a second extraction was carried out using 600 ml of methanol for three days. The powder was dried in the vacuum oven at room temperature and 1.93 g of dry insoluble polythieno[3,4-b]thiophene was obtained as a black powder. The polythieno[3,4-b]thiophene was then transferred to a vial containing 19.98 g of hydrazine hydrate and stirred for two days at room temperature. A small amount of ethanol was added to the vial and filtered. The filtrate was washed with fresh ethanol several times. Finally, it was washed with acetone and ethanol, respectively. The filtrate was dried in a vacuum oven at 70° C. After drying, the filtrate was grinded to a fine powder to result in 1.86 g of insoluble reduced polythieno [3,4-b]thiophene as a black powder.

The polythieno[3,4-b]thiophene was sulfonated to 65% by adding 1.72 g of the insoluble polythieno[3,4-b] thiophene to a 250 ml 1-neck round bottomed flask. Fuming sulfuric acid (100 ml, Acros, 20% free $SO_3$) was then added to the flask. The reaction flask was equipped with a reflux condenser and the oil bath temperature was increased to 65–70° C. The reaction was carried out for six hours and then stirred overnight at room temperature. After the reaction, the reaction mixture was dropped into cold THF keeping the temperature between 10–20° C. Diethyl ether (300 ml) was added and the resulting precipitate was filtered and then dried in a vacuum oven at 70° C. and 65% sulfonated polythieno[3,4-b]thiophene (1.42 g) was obtained. The sulfonation level of the resulting polythieno [3,4-b]thiophene was confirmed by titration with sodium hydroxide. The resulting polymer was determined to have a solubility in water of about 25 mg/ml and a band gap (Eg) of about 1 eV as determined from the onset of pi to pi* transition.

Example 4

Layer-by-layer (LBL) Deposition of Sulfonated Polythieno [3,4-b]thiophene with Polyethyleneimine Two water solutions were prepared, one containing polyethyleneimine (PEI) and the other containing sulfonated polythieno[3,4-b]thiophene. Polyethyleneimine water solution (30.0 mg, low molecular and branched type, 50 wt % in water) was weighed and dissolved into 17.52 g of deionized water. The pH of the solution was adjusted to 3.8 by adding few drops of aqueous HCl. An aqueous solution containing sulfonated polythieno[3,4-b]thiophene was prepared by dissolving 7.3 mg of 65% sulfonated polythieno[3,4-b] thiophene in 17.57 g of deionized water (DI).

Indium doped Tin Oxide (ITO) coated glass (Rs=15–25Ω, unpolished float glass from Delta Technologies, Limited) was used as the substrate for layer-by-layer deposition. One of the ITO glass was surface treated with Piranah solution for 30 minutes. After that, it was thoroughly washed using DI water and dried in the vacuum oven. Alternatively, the ITO surface was cleaned in a sonication bath with DI water and dried in a vacuum oven.

The ITO glass substrate was dipped in PEI solution for 15 minutes to deposit a polycation layer on ITO substrate (as the ITO has a slight negative charge the polycation is deposited on the substrate first). The resulting coated substrate was then cleaned by dipping in DI water for two minutes. The substrate was then dipped into the aqueous solution of sulfonated polythieno[3,4-b]thiophene for 15 minutes and washed by dipping in DI water for 2 minutes. These two layers of polymer constitute a bilayer. The above process was repeated until 20 bilayers were obtained. In each step, the DI wash water solution was exchanged with fresh DI water. The same polyethyleneimine and poly(thieno[3,4-b]thiophene) water solutions were used throughout the 20 bilayer thick film formation. A Vis-NIR spectrum was taken after each bilayer deposition and the results are provided in FIG. 2.

Example 5

Thin Films of a Sulfonated Polythieno[3,4-b]thiophene/Polystyrene Sodium Sulfonate Blend.

Polystyrenesulfonate sodium salt (20.2 mg, 200,000 number average molecular weight) solution in water (30wt%) was mixed with 5 g of a 65% sulfonated polythieno[3,4-b]thiophene water solution whose concentration is 5.7 mg of polythieno[3,4-b]thiophene sulfonic acid per ml water. Sodium polystyrenesulfonate content is 21.3 wt % based on solid content. This solution was drop cast onto normal glass substrate to form a film of approximately two micrometers in thickness.

The essential characteristics of the present invention are described completely in the foregoing disclosure. One skilled in the art can understand the invention and make various modifications without departing from the basic spirit of the invention, and without deviating from the scope and equivalents of the claims, which follow.

What is claimed is:

1. A composition, comprising:
a substituted polymer comprising units of substituted thieno[3,4-b]thiophene prepared by electrophilic substitution of a first polymer comprising thieno[3,4-b]thiophene units, wherein the electrophilic substitution reaction is sulfonation, nitration, halogenation, or a combination comprising at least one of the foregoing reactions.

2. The composition of claim 1, wherein the electrophilic substitution reaction is sulfonation.

3. The composition of claim 1, wherein the thieno[3,4-b]thiophene units of the substituted polymer are substituted with sulfonic acid ($-SO_3H$), sulfonate ($-SO_3^-$), halogen, nitro, or a combination comprising at least one of the foregoing substituents.

4. The composition of claim 3, wherein the substitution is sulfonic acid ($-SO_3H$), sulfonate ($-SO_3^-$), or a combination comprising at least one of the foregoing substituents.

5. The composition of claim 1, wherein about 1 to about 99 mole percent of the thieno[3,4-b]thiophene units are substituted.

6. The composition of claim 1, wherein about 10 to about 80 mole percent of the thieno[3,4-b]thiophene units are substituted.

7. The composition of claim 1, wherein about 30 to about 70 mole percent of the thieno[3,4-b]thiophene units are substituted.

8. The composition of claim 1, wherein the substituted polymer comprises units of sulfonated thieno[3,4-b]thiophene and wherein the composition further comprises a base.

9. The composition of claim 8, wherein the base is metal hydroxide, $C_1-C_{24}$ primary amine, $C_1-C_{24}$ secondary amine, $C_1-C_{24}$ tertiary amine, polyamine, or a combination comprising at least one of the foregoing.

10. The composition of claim 1, wherein the substituted polymer is soluble or dispersible in water or organic solvents.

11. The composition of claim 1, wherein the substituted polymer is water soluble at greater than or equal to about 5 mg/ml.

12. The composition of claim 1, wherein the first polymer is a copolymer comprising thieno[3,4-b]thiophene units and units derived from thiophene, substituted thiophene, dithieno[3,4-b:3',4'-d]thiophene, bithiophene, pyrrole, substituted pyrrole, phenylene, substituted phenylene, naphthalene, substituted naphthalene, biphenyl, substituted biphenyl, terphenyl, substituted terphenyl, phenylene vinylene, substituted phenylene vinylene, or a combination comprising at least one of the foregoing co-monomers, wherein the substituents are one or more of —H, hydroxyl, $C_6-C_{36}$ aryl, $C_3-C_6$ cycloalkyl, $C_1-C_{12}$ alkyl, halogen, $C_1-C_{12}$ alkoxy, $C_1-C_{12}$ alkylthio, $C_1-C_{12}$ perfluoroalkyl, $C_6-C_{36}$ perfluoroaryl, pyridyl, cyano, thiocyanato, nitro, amino, $C_1-C_{12}$ alkylamino, $C_1-C_{12}$ aminoalkyl, acyl, sulfoxyl, sulfonyl, amido, carbamoyl, or a combination comprising at least one of the foregoing substituents.

13. The composition of claim 1, further comprising an additional conjugated polymer, insulating polymer, or a combination comprising at least one of the foregoing polymers to form a blend.

14. The composition of claim 1, wherein the polymer is n-doped or p-doped.

15. An article comprising the substituted polymer of claim 1.

16. The composition of claim 3, wherein the nitro substituent is reduced to an amino substituent, and optionally futher protonated to an ammonium substituent.

17. A composition, comprising:
a substituted polymer comprising units of substituted thieno[3,4-b]thiophene prepared by electrophilic substitution of a first polymer comprising thieno[3,4-b]thiophene units, wherein the electrophilic substitution reaction is sulfonation, nitration, alkylation, acylation, halogenation, or a combination comprising at least one of the foregoing reactions; and wherein about 10 to about 80 mole percent of the thieno[3,4-b]thiophene units are substituted.

18. A method of preparing a polymer, comprising:
performing an electrophilic substitution reaction on a first polymer comprising thieno[3,4-b]thiophene units to form a substituted polymer comprising substituted thieno[3,4-b]thiophene units.

19. The method of claim 18, wherein the electrophilic substitution reaction is sulfonation, nitration, alkylation, acylation, halogenation, or a combination comprising at least one of the foregoing reactions.

20. The method of claim 18, wherein the electrophilic substitution reaction is sulfonation.

21. The method of claim 18, wherein the substituted thieno[3,4-b]thiophene units comprise substituents, wherein the substituents are sulfonic acid ($-SO_3H$), sulfonate ($-SO_3^-$), halogen, nitro, acyl, alkyl, or a combination comprising at least one of the foregoing substituents.

22. The method of claim 21, wherein the substituents are sulfonic acid ($-SO_3H$), sulfonate ($-SO_3^-$), or a combination comprising at least one of the foregoing substitutions.

23. The method of claim 18, wherein about 1 to about 99 mole percent of the thieno[3,4-b]thiophene units are substituted.

24. The method of claim 18, wherein about 10 to about 80 mole percent of the thieno[3,4-b]thiophene units are substituted.

25. The method of claim 18, wherein about 30 to about 70 mole percent of the thieno[3,4-b]thiophene units are substituted.

26. The method of claim 18, wherein the substituted polymer comprises units of sulfonated thieno[3,4-b]thiophene and wherein the method further comprises adding a base to the substituted polymer to form a complex.

27. The method of claim 26, wherein the base is metal hydroxide, $C_1$–$C_{24}$ primary amine, $C_1$–$C_{24}$ secondary amine, $C_1$–$C_{24}$ tertiary amine, polyamine, or a combination comprising at least one of the foregoing.

28. The method of claim 18, wherein the substituted polymer is water soluble.

29. The method of claim 18, wherein the substituted polymer is soluble in organic solvents.

30. The method of claim 18, wherein the substituted polymer is dispersible in water or organic solvents.

31. The method of claim 18, wherein the substituted polymer is n-doped or p-doped.

32. An article comprising the substituted polymer prepared by the method of claim 18.

33. A film, comprising a layer of the substituted polymer prepared by the method of claim 18, and a layer comprising a base, wherein the base is metal hydroxide, $C_1$–$C_{24}$ primary amine, $C_1$–$C_{24}$ secondary amine, $C_1$–$C_{24}$ tertiary amine, polyamine, or a combination comprising at least one of the foregoing.

34. An article comprising the film of claim 33.

35. The method of claim 21, further comprising reducing the nitro substituent to an amino substituent;

or reducing the nitro substituent to an amino substituent, and protonating the amino substituent to form an ammonium substituent.

* * * * *